(12) United States Patent
Cronin

(10) Patent No.: US 8,995,972 B1
(45) Date of Patent: Mar. 31, 2015

(54) AUTOMATIC PERSONAL ASSISTANCE BETWEEN USERS DEVICES

(71) Applicant: OTO Technologies LLC, Charleston, SC (US)

(72) Inventor: John Cronin, Bonita Springs, FL (US)

(73) Assignee: GrandiOs Technologies, LLC, Wilmington, DE (US)

( * ) Notice: Subject to any disclaimer, the term of this patent is extended or adjusted under 35 U.S.C. 154(b) by 0 days.

(21) Appl. No.: 14/309,217

(22) Filed: Jun. 19, 2014

Related U.S. Application Data

(60) Provisional application No. 62/007,933, filed on Jun. 5, 2014.

(51) Int. Cl.
*H04L 29/06* (2006.01)
*G10L 15/22* (2006.01)
*H04W 4/18* (2009.01)
*H04W 4/02* (2009.01)

(52) U.S. Cl.
CPC ............. *G10L 15/22* (2013.01); *H04W 4/18* (2013.01); *H04W 4/02* (2013.01); *G10L 2015/223* (2013.01)
USPC ............. 455/414.3; 455/456.3; 455/569.2

(58) Field of Classification Search
CPC ................................................... H04W 4/001
USPC ........................... 455/414.3, 456.1, 569.2
See application file for complete search history.

(56) References Cited

U.S. PATENT DOCUMENTS

| | | |
|---|---|---|
| 6,212,408 B1 | 4/2001 | Son et al. |
| 6,996,227 B2 | 2/2006 | Albal et al. |
| 7,912,910 B2 | 3/2011 | Banerjee et al. |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,626,465 B2 | 1/2014 | Moore et al. |
| 8,630,216 B2 | 1/2014 | Deivasigamani et al. |
| 8,660,501 B2 | 2/2014 | Sanguinetti |
| 8,706,044 B2 | 4/2014 | Chang et al. |
| 8,724,723 B2 | 5/2014 | Panicker et al. |
| 8,750,207 B2 | 6/2014 | Jeong et al. |

(Continued)

OTHER PUBLICATIONS

Botla, Purshotham; "Designing Personal Assistant Software for Task Management using Semantic Web Technologies and Knowledge Databases", May 2013.

(Continued)

*Primary Examiner* — David Q Nguyen
(74) *Attorney, Agent, or Firm* — Lewis Roca Rothgerber LLP

(57) ABSTRACT

Methods and systems are presented for providing automatic personal assistance on a user device (e.g., mobile phone). In some embodiments, a personal assistant on a first user device may respond automatically to a received input communication from a second user device. In some embodiments, the personal assistant may perform a local search of data stored on the first user device in order to retrieve data responsive to the received input. In some embodiments, the personal assistant may perform a local load of an entry into an application on the first user device in order to perform an action responsive to the received user input. In some embodiments, the automatic response may include sending a responsive output communication to the second user device. The automatic personal assistance may be customized based on user-editable automatic personal assistance settings.

20 Claims, 7 Drawing Sheets

(56) References Cited

U.S. PATENT DOCUMENTS

| | | | |
|---|---|---|---|
| 8,793,094 | B2 | 7/2014 | Tam et al. |
| 8,816,868 | B2 | 8/2014 | Tan et al. |
| 8,831,529 | B2 | 9/2014 | Toh et al. |
| 8,831,655 | B2 | 9/2014 | Burchill et al. |
| 8,836,851 | B2 | 9/2014 | Brunner |
| 8,843,158 | B2 | 9/2014 | Nagaraj |
| 8,849,308 | B2 | 9/2014 | Marti et al. |
| 8,862,060 | B2 | 10/2014 | Mayor |
| 8,873,418 | B2 | 10/2014 | Robinson et al. |
| 8,874,090 | B2 | 10/2014 | Abuan et al. |
| 8,917,632 | B2 | 12/2014 | Zhou et al. |
| 8,934,921 | B2 | 1/2015 | Marti et al. |
| 2005/0053201 | A1 | 3/2005 | Bhargava et al. |
| 2006/0067352 | A1 | 3/2006 | John et al. |
| 2007/0011610 | A1 | 1/2007 | Sethi et al. |
| 2007/0035513 | A1 | 2/2007 | Sherrard et al. |
| 2009/0111529 | A1* | 4/2009 | Miyake ............... 455/569.2 |
| 2010/0103242 | A1 | 4/2010 | Linaker |
| 2010/0332583 | A1 | 12/2010 | Szabo |
| 2011/0037777 | A1 | 2/2011 | Lindahl et al. |
| 2011/0119242 | A1 | 5/2011 | Chen et al. |
| 2011/0153324 | A1 | 6/2011 | Ballinger et al. |
| 2011/0276583 | A1 | 11/2011 | Stone et al. |
| 2012/0016678 | A1 | 1/2012 | Gruber et al. |
| 2012/0041903 | A1 | 2/2012 | Beilby et al. |
| 2012/0066393 | A1 | 3/2012 | Tekwani |
| 2012/0245944 | A1 | 9/2012 | Gruber et al. |
| 2012/0265528 | A1 | 10/2012 | Gruber et al. |
| 2012/0311583 | A1 | 12/2012 | Gruber et al. |
| 2012/0311584 | A1 | 12/2012 | Gruber et al. |
| 2013/0024196 | A1 | 1/2013 | Ganong, III et al. |
| 2013/0036211 | A1 | 2/2013 | Messer et al. |
| 2013/0054697 | A1* | 2/2013 | Cha ...................... 709/204 |
| 2013/0073286 | A1 | 3/2013 | Bastea-Forte et al. |
| 2013/0110505 | A1 | 5/2013 | Gruber et al. |
| 2013/0159377 | A1 | 6/2013 | Nash |
| 2013/0185336 | A1 | 7/2013 | Singh et al. |
| 2013/0185368 | A1 | 7/2013 | Nordstrom et al. |
| 2013/0225137 | A1 | 8/2013 | Greisson |
| 2013/0225140 | A1 | 8/2013 | Greisson |
| 2013/0244579 | A1 | 9/2013 | Hohteri et al. |
| 2013/0258040 | A1 | 10/2013 | Kaytaz et al. |
| 2013/0278492 | A1 | 10/2013 | Stolarz et al. |
| 2013/0303192 | A1 | 11/2013 | Louboutin |
| 2013/0304758 | A1 | 11/2013 | Gruber et al. |
| 2013/0311598 | A1 | 11/2013 | Arrouye et al. |
| 2013/0311997 | A1 | 11/2013 | Gruber et al. |
| 2013/0317835 | A1 | 11/2013 | Mathew |
| 2013/0318473 | A1 | 11/2013 | Van Os et al. |
| 2013/0328917 | A1 | 12/2013 | Zhou |
| 2013/0331087 | A1 | 12/2013 | Shoemaker |
| 2013/0331118 | A1 | 12/2013 | Chhabra |
| 2013/0331137 | A1 | 12/2013 | Burchill |
| 2013/0332108 | A1 | 12/2013 | Patel |
| 2013/0332156 | A1 | 12/2013 | Tackin |
| 2013/0339334 | A1 | 12/2013 | Brown et al. |
| 2014/0059644 | A1* | 2/2014 | Shin et al. ............ 726/2 |
| 2014/0062773 | A1 | 3/2014 | MacGougan |
| 2014/0065962 | A1 | 3/2014 | Le |
| 2014/0071221 | A1 | 3/2014 | Dave |
| 2014/0105084 | A1 | 4/2014 | Chhabra |
| 2014/0139380 | A1 | 5/2014 | Ouyang |
| 2014/0141803 | A1 | 5/2014 | Marti |
| 2014/0162628 | A1 | 6/2014 | Bevelacqua |
| 2014/0167794 | A1 | 6/2014 | Nath |
| 2014/0168170 | A1 | 6/2014 | Lazarescu |
| 2014/0171114 | A1 | 6/2014 | Marti |
| 2014/0173439 | A1* | 6/2014 | Gutierrez et al. ........... 715/727 |
| 2014/0180820 | A1 | 6/2014 | Louboutin |
| 2014/0191979 | A1 | 7/2014 | Tsudik |
| 2014/0200053 | A1 | 7/2014 | Balasubramanian |
| 2014/0213280 | A1* | 7/2014 | Sandel et al. ............ 455/456.1 |
| 2014/0222335 | A1 | 8/2014 | Piemonte |
| 2014/0232633 | A1 | 8/2014 | Shultz |
| 2014/0232634 | A1 | 8/2014 | Piemonte |
| 2014/0247279 | A1 | 9/2014 | Nicholas |
| 2014/0247280 | A1 | 9/2014 | Nicholas |
| 2014/0269562 | A1 | 9/2014 | Burchill |
| 2014/0274150 | A1 | 9/2014 | Marti |
| 2014/0283135 | A1 | 9/2014 | Shepherd |
| 2014/0293959 | A1 | 10/2014 | Singh |
| 2014/0364089 | A1 | 12/2014 | Lienhart |
| 2014/0364148 | A1 | 12/2014 | Block |
| 2014/0365120 | A1 | 12/2014 | Vulcano |
| 2015/0011242 | A1 | 1/2015 | Nagaraj |
| 2015/0026623 | A1 | 1/2015 | Horne |
| 2015/0031397 | | 1/2015 | Jouaux |

OTHER PUBLICATIONS

Campbell, Mikey, "Apple's 'smart dock' would give Siri a permanent place in the home," Dec. 5, 2013, pp. 1-13, http://appleinsider.com/articles/13/12/05/apples-smart-dock-would-bring-siri-into-the-home.

"Gotopal—Your virtual personal assistance", by Indiegogo; Date of download: Jul. 10, 2014.

Joyce, Stephen; Tlabs Showcase—Siri—Tnooz; Date of download: Nov. 26, 2013.

Kazmucha, Allyson; "How to call, message, and email your contacts using Siri", iMore. Jun. 18, 2014.

Lardinois, Frederic; "Google Now: There's a Fine Line Between Cool and Creepy", TechCrunch, Jul. 22, 2012.

Leber, Jessica; "Smart Assistant Listens to You Talk, Fetches Info Automatically", MIT Technology Review. Jan. 17, 2013.

"Microsoft unveils new Siri-like phone assistant", the Logan Reporter, Apr. 3, 2014.

"Mobile Voice Conference 2014" San Francisco, CA Mar. 3-5, 2014.

Petersen, Sobah Abbas; "Distributed Artificial Intelligence and Intelligent Agents." Jan. 30, 2003 http://www.idi.ntnu.no/~agent/.

Sateli, Bahar; "Smarter Mobile Apps through Integrated Natural Language Processing Services", Semantic Software Lab, Dept. of Computer Science and Software Engineering, Concordia University. Aug. 2013.

Speaktoit—Your Personal Assistant; Date of download: Jul. 14, 2014.

Tambe, Milind; "Electric Elves: What Went Wrong and Why" 2005.

"The Design a Proactive Personal Agent for Task Management", Jan. 11, 2011. International Journal on Artificial Intelligence Tools, vol. 21, No. 1 (2012) 1250004 (30 pages) © World Scientific Publishing Company.

U.S. Appl. No. 14/261,421; Final Office Action mailed Nov. 19, 2014.

U.S. Appl. No. 14/261,721; Office Action mailed Oct. 8, 2014.

Chalupsky, Hans; "Electronic Elves: Agent Technology for Supporting Human Organization", Information Sciences Institute and Computer Science Dept., University of Southern California. 2002.

Collaborative and Conversational Agents, "Human-Computer Interactions." 2013.

Gervasio, Melinda T., "Active Preference Learning for Personalized Calendar Scheduling Assistance", AL Center, SRI International. IUI'05, Jan. 9-12, 2005.

Hartung, Daniel and Busch, Christoph; "Biometric Transaction Authentication Protocol: Formal Model Verification and "Four-Eyes" Principle Extension", Norwegian Information Security Laboratory Faculty for Computer Science and Media Technology, Gjovik University College. 2011.

"The Siri Handbook", by BookCap Study Guides © 2011 by Golgatha Press, Inc., Published at SmashWords. Date of download: Jul. 16, 2014.

U.S. Appl. No. 14/261,421; Office Action mailed Aug. 28, 2014.

U.S. Appl. No. 14/311,538; Office Action mailed Aug. 29, 2014.

* cited by examiner

AUTOMATIC PERSONAL ASSISTANCE BETWEEN USERS DEVICES

CROSS-REFERENCE TO RELATED APPLICATIONS

The present invention claims priority benefit to U.S. provisional patent application No. 62/007,933, filed Jun. 5, 2014, the entirety of which is incorporated by reference.

BACKGROUND OF THE INVENTION

1. Field of the Invention

The present invention generally concerns a personal assistant feature on a user device. More particularly, the present invention concerns providing automatic personal assistance on a user device.

2. Description of the Related Art

A digital intelligent personal assistant software application (e.g., personal assistant) is commonly run on a smart phone or intelligent device. Personal assistant applications may respond to user input, including, for example, voice-based input, often taking the form of a query or command. Based on the received user input, a personal assistant application may perform tasks by utilizing location awareness and accessing information stored on the smart device and web services. In doing so, the application appears to answer questions, make recommendations, and perform other actions. A personal assistant may perform pointed actions in response to user commands, including, for example, sending a message to a particular person or scheduling a specific meeting at a specific time in a calendar.

Existing personal assistant applications are capable of performing an increasing number of commands, but existing personal assistant applications do not provide for automatic interaction of two personal assistants on two user devices, where the interactions may not require user involvement. Thus, there exists a need to provide personal assistant features on a first user device that may be automatically invoked by input received from a second personal assistant on a second user device.

SUMMARY OF THE CLAIMED INVENTION

Methods and systems are presented for providing automatic personal assistance on a user device (e.g., mobile phone). In some embodiments, a personal assistant on a first user device may respond automatically to a received input communication from a second user device. In some embodiments, the personal assistant may perform a local search of data stored on the first user device in order to retrieve data responsive to the received input. In some embodiments, the personal assistant may perform a local load of an entry into an application on the first user device in order to perform an action responsive to the received user input. In some embodiments, the automatic response may include sending a responsive output communication to the second user device. The automatic personal assistance may be customized based on user-editable automatic personal assistance settings.

Various embodiments may include methods for providing automatic personal assistance on a first user device. Such methods may include receiving an input communication, at a communications interface on the first user device, the input communication transmitted over a network from a second device. The methods may further include activating an automatic mode of a first personal assistant on the first user device. The methods may further include parsing the received input communication, by the first personal assistant, to identify one or more keywords in the received input communication, the one or more keywords associated with a responsive action, wherein the first personal assistant processes the received input communication automatically. The methods may further include performing the identified responsive action, by the first personal assistant, and generating an output communication responsive to the input communication, by the first personal assistant, wherein the output communication is transmitted over the network to the second device, and wherein the output communication includes information associated with the performed responsive action.

Various embodiments may further include systems for providing automatic personal assistance on a first user device. Such systems may include a communications interface on the first user device that receives an input communication transmitted over a network from a second device. The systems may further include a memory that stores instructions, and a processor that executes the instructions stored in the memory. The processor may execute the instructions to activate an automatic mode of a first personal assistant on the first user device. The processor may further execute the instructions to parse the received input communication, by the first personal assistant, to identify one or more keywords in the received input communication, the one or more keywords associated with a responsive action, wherein the first personal assistant processes the received input communication automatically. The processor may further execute the instructions to perform the identified responsive action, by the first personal assistant, and to generate an output communication responsive to the input communication, by the first personal assistant, wherein the output communication is transmitted over the network to the second device, and wherein the output communication includes information associated with the performed responsive action.

Embodiments of the present invention may further include non-transitory computer-readable storage media, having embodied thereon a program executable by a processor to perform methods for providing automatic personal assistance on a user device as described herein.

DETAILED DESCRIPTION

Methods and systems are presented for providing automatic personal assistance with a personal assistant feature of a user device (e.g., mobile phone). In some embodiments, a first personal assistant on a first user device may receive a personal assistance command from a second personal assistant on a second user device. The first personal assistant may perform an action responsive to the received command based on user settings. In some embodiments, the first personal assistant may automatically perform the responsive action (i.e., no user input is required for performance of the action). In some embodiments, the first personal assistant may receive the personal assistant command, identify a responsive action, and prompt a user of the first user device for permission before performing the identified responsive action. at an interface of a user device, a personal assistant feature will return a customizable status report. Personal assistant software may be an application loaded onto the user device by the user, or any combination of software, firmware, and hardware that is incorporated into the user device. A personal assistant software application on a user device may provide a status report based on local status data stored locally on the user device and/or remote status data accessed through a network.

Figure 1:
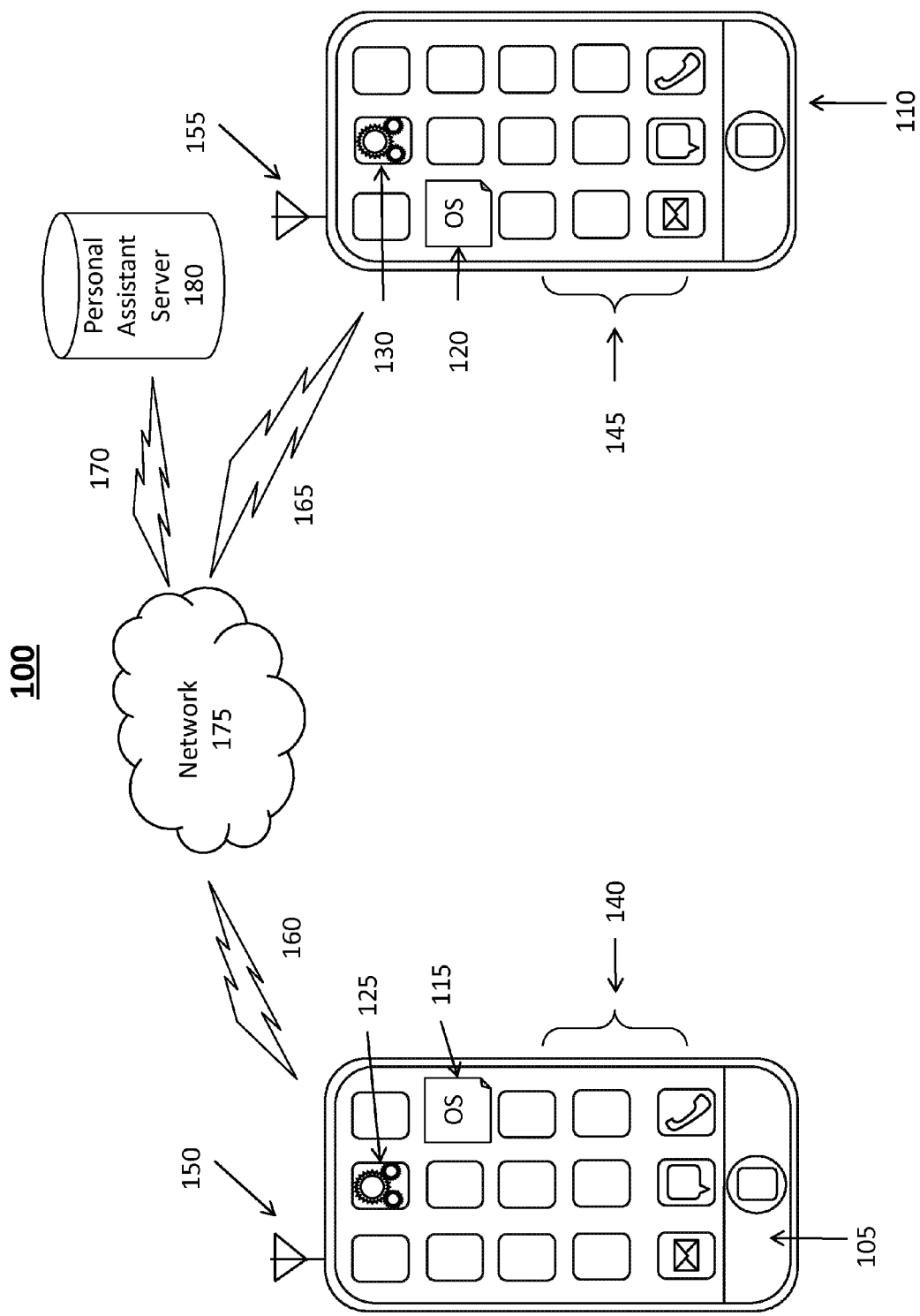
FIG. 1 illustrates an exemplary network environment in which a system for providing automatic personal assistant features on a user device may be implemented.

FIG. 1 illustrates an exemplary network environment 100 in which a system for providing automatic personal assistant features on a user device may be implemented. Network environment 100 may include user devices 105 and 110, network 175, network connections 160, 165, and 170, and third party server 180. Any combination of the components illustrated in network environment 100, including user devices 105 and 110, network 175, network connections 160, 165, and 170, third party server 180, and modules, processes, or subsystems of each, and any other hardware, software, or both, for implementing the features described in the present disclosure may be collectively referred to, herein, as "the system."

User devices 105 and 110 may be any number of different electronic user devices, including, for example, general purpose computers, mobile phones, smartphones, personal digital assistants (PDAs), portable computing devices (e.g., laptop, netbook, tablet), desktop computing devices, handheld computing device, or any other type of computing device capable of communicating over network 175. User devices 105 and 110 may also be configured to access data from other storage media, such as memory cards or disk drives as may be appropriate in the case of downloaded services. User devices 105 and 110 may include standard hardware computing components, including, for example, network and media interfaces, non-transitory computer-readable storage (memory), and processors for executing instructions that may be stored in memory.

In the illustrated embodiment, user devices 105 and 110 (e.g., mobile phone) include a display. In some implementations, the display may be a touchscreen display. In some implementations, the display is a user interface. As shown in the illustrated embodiment, a display of user devices 105 and 110 may display icons corresponding to applications (i.e., applications 140). The displays of user devices 105 and 110 may include any suitable soft keys. It will be understood that user devices 105 and 110 may include other elements not shown, for example, a microphone, camera, speaker, or any other suitable hardware or software elements.

User devices 105 and 110 may include respective operating systems 115 and 120. Operating systems 115 and 120 may be software that manages the use of hardware, computer programs, and applications of user device 105. Operating systems 115 and 120 may be, for example, Windows, iOS, OS X, Android, UNIX, or Linux. User device 105 may additionally include settings 125, which may include configurable components of operating system 115. User device 110 may additionally include settings 130, which may include configurable components of operating system 120. Settings 125 and 130 may be modifiable by a user of the respective user devices 105 and 110 to alter the performance of operating systems 115 and 120 and other software on user devices 105 and 110. In some embodiments, settings 125 and 130 may be applications on respective user devices 105 and 110, by which a user may select options and preferences and configures operating system functions. In an example, operating systems 115 and 120 of user devices 105 and 110 (e.g., an Apple device) may be iOS, and settings 125 and 130 of user devices 105 and 110 may be iOS settings. In another example, operating systems 115 and 120 may be LINUX, and settings 125 and 130 may be LINUX configuration files. In some embodiments, settings 125 and 130 may include personal assistant settings, which are modifiable by a user to alter the performance of personal assistant software on user devices 105 and 110. In some embodiments, settings 125 and 130 may be modifiable by a user to configure the ability of personal assistant software running on one of user devices 105 and 110 to automatically interact with personal assistant software running the other of user devices 105 and 110.

User devices 105 and 110 may include any suitable software or applications. In some embodiments, personal assistant software (not shown) runs on user devices 105 and 110. The personal assistant may be software capable of performing tasks for a user based on, for example, user input, location awareness (e.g., using a global positioning system), user settings 125 and 130, locally stored information (e.g., in memory of user devices 105 and 110) and information accessible over a network (e.g., network 175) from a personal assistant server 180 and third party databases (not shown). Existing, exemplary, personal assistants include, for example, SIRI® services (for Apple devices), GOOGLE NOW® services (for Google Android devices), S VOICE® (for Samsung devices), and VOICE MATE® services, (for LG Electronics devices). It will be understood that the examples of existing intelligent personal assistants described herein are merely exemplary, and the system of the present disclosure may be implemented using any suitable hardware and/or software.

In some embodiments, personal assistants are personal assistant applications running on respective user devices 105 and 110. Personal assistant software may, for example, send messages, make telephone calls, set reminders, make calendar appointments, retrieve data locally or remotely, perform internet searches, or perform any other suitable actions in response to user input. In some embodiments, depressing an electromechanical button may activate the personal assistant. In some embodiments, actuating a personal assistant soft key may turn the personal assistant ON or OFF. Personal assistant software of user device 105 may receive a command from personal assistant software of user device 110. In some embodiments, personal assistant software of user device 105 may process the received command from personal assistant software of user device 110 and automatically perform an action responsive to the command. For example, personal assistant software of user device 110 may send a command that includes a request for an appointment at a particular date and time to personal assistant software of user device 105, and personal assistant software of user device 105 may, in response, load a new appointment to a calendar on user device 105 and/or send a text message to personal assistant software of user device 110 confirming the appointment. In some embodiments, the ability of personal assistants on user devices 105 and 110 to automatically interact with each other is determined by user settings (i.e., settings 125 and 130).

Applications 140 and 145 are software modules on respective user devices 105 and 110, which may be downloaded from remote servers. Applications 140 and 145 may provide additional functions for user devices 105 and 110. For example, applications 140 and 145 may be any suitable applications downloaded from, for example, Apple Inc.'s APP STORE® (for Apple devices), GOOGLE PLAY® (for Google Android devices), or any other suitable database or server. In some embodiments, applications 140 and 145 may be software, firmware, or hardware that is integrated into user devices 105 and 110.

Antennas 150 and 155 are components of user devices 105 and 110. In some embodiments, user devices 105 and 110 may use respective antennas 150 and 155 to send and receive information wirelessly. For example, antennas 150 and 155 may be cellular data antennas, Wi-Fi antennas, or BLUETOOTH® antennas.

Network connections 160, 165, and 170 may include any suitable wired or wireless transmission mediums or channels through which data may be communicated between user devices 105 and 110, network 175, and personal assistant server 180. Network connections 160, 165, and 170 may include, for example, a computer networking cable, an Ethernet cable, a cellular communications network, an Internet data trunk (e.g., single transmission channel), a wireless local area network, a wide area network, or a telecommunications network (e.g., 4G wireless network).

Network 175 may include the Internet, a system of interconnected computer networks that use a standard protocol, a dispersed network of computers and servers, a local network, a public or private intranet, any other coupled computing systems, or any combination thereof. In some embodiments, network 175 may be a cloud, which is a network of remote servers hosted on the Internet and used to store, manage, and process data in place of local servers or personal computers. User devices 105 and 110 may be coupled to network 175 though any suitable wired or wireless connection. In some embodiments, user device 105 may be coupled to network 175 via network connection 160, and user device 110 may be coupled to network 175 via network connection 165.

Network 175 may allow for communication between the user devices 105 and 110, and personal assistant server 180 via various communication paths or channels. Such paths or channels may include any type of data communication link known in the art, including TCP/IP connections and Internet connections via Wi-Fi, BLUETOOTH, a Universal Mobile Telecommunications System (UMTS) network, or any other suitable data communication link. In that regard, network 175 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Network 175 allows for communication between any of the various components of network environment 100.

Personal assistant server 180 is a server that manages functions of the personal assistants running on user devices 105 and 110 and is coupled to network 175 via network connection 170. Personal assistant server 180 may be any suitable remote or local server that stores data. In some embodiments, personal assistant server 180 is an electronic storage device. Personal assistant server 180 is accessible by other devices through network 175.

Personal assistant server 180 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Alternatively, different functionalities may be allocated among multiple servers, which may be located remotely from each other and communicate over the cloud. Any of the aforementioned servers (or an integrated server) may take on certain client-side, cache, or proxy server characteristics. These characteristics may depend on the particular network placement of the server or certain configurations of the server.

Figure 2:
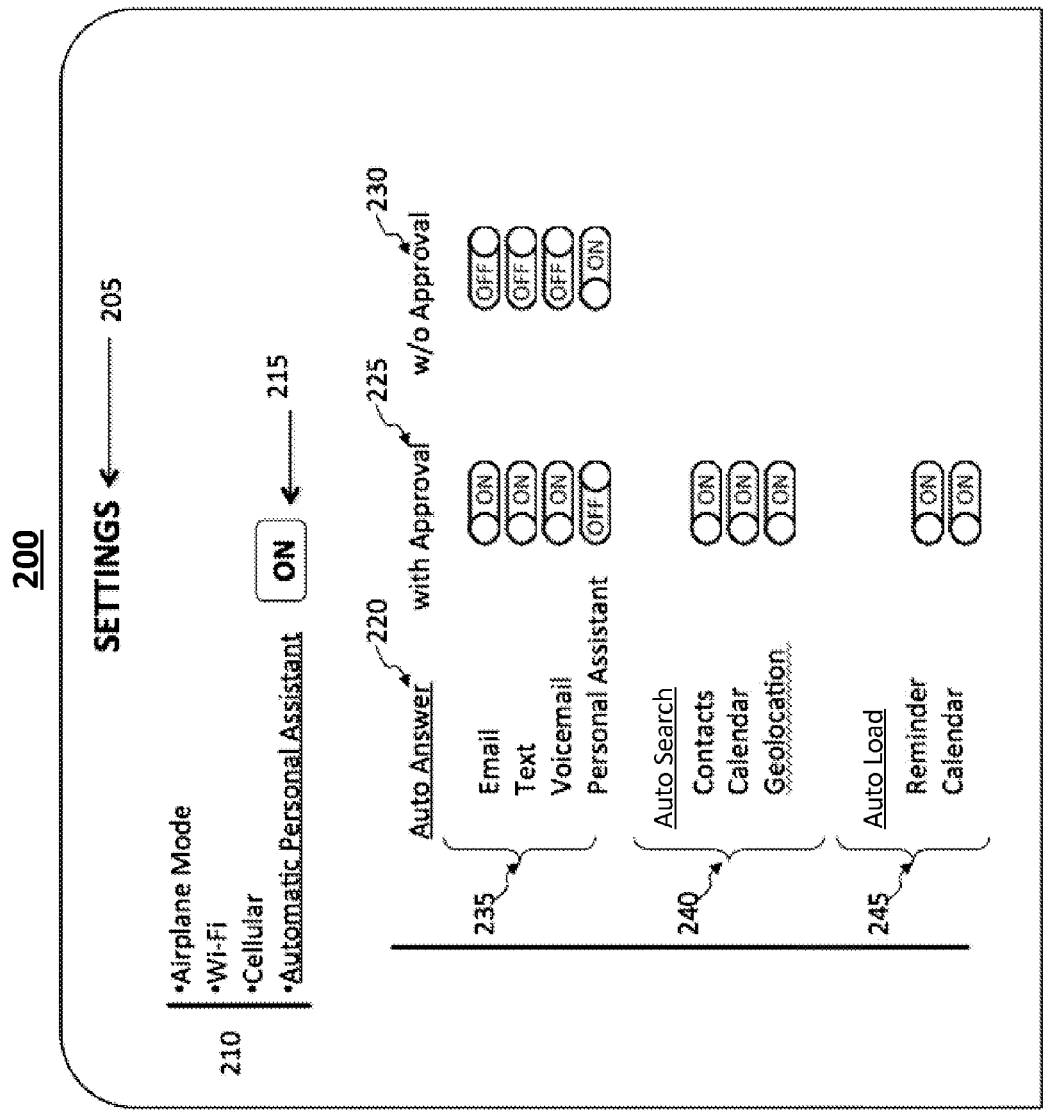
FIG. 2 is a diagram illustrating exemplary settings of an operating system on a user device that may be used with a system for providing automatic personal assistant features.

FIG. 2 is a diagram illustrating exemplary settings 200 of an operating system on a user device that may be used with a system for providing automatic personal assistant features. In some embodiments, settings 200 may be displayed on a user interface of respective user devices 105 and 110 of FIG. 1. In some embodiments, settings 200 may correspond to settings 125 and 130 of user devices 105 and 110 of FIG. 1. Settings 200 may, for example, provide a mechanism by which a user may alter the functions of an operating system of a user device by implementing changes to settings. Settings 200 may facilitate user interaction with a user device.

Settings 200 may include settings menu 205. Settings menu 205 may include user-editable features for customizing the functionality of an operating system or user device according to user preferences. In some implementations, settings 125 and 130 of user devices 105 and 110 of FIG. 1 to alter the performance of respective operating systems 115 and 120. In some implementations, settings 125 and 130 of user devices 105 and 110 of FIG. 1 to alter the performance of respective personal assistant applications. In some embodiments, settings 200 may be modified by the user interacting with options or commands in a respective settings menu 205. Settings menu 205 may include any number of user-selectable options or commands. Settings menu 205 may include any suitable number of standard operating system or user device settings, for example, standard settings 210, including airplane mode, Wi-Fi, and cellular, as shown in FIG. 2. Standard settings 210 are exemplary interface elements that, when selected by a user, may, for example, redirect the user to a respective new page, window, or dialogue box.

In some embodiments, settings menu 205 includes a list of user-selectable options or settings presented in a hierarchical order. For example, automatic personal assistant settings 215 may be sub-settings under standard settings 210. Standard settings 210 may include automatic personal assistant settings 215, which is shown as selected (e.g., underlined) in FIG. 2, and the selection of automatic personal assistant settings 215 may reveal automatic personal assistance settings 220-245. Automatic personal assistant settings 215 may include exemplary settings categories that, when selected by a user, may, for example, redirect the user to a respective new page, window, or dialogue box. In another example, when selected, any of the interface elements may expand to reveal sub-options, sub-commands, or any other suitable settings display elements.

In some embodiments, automatic personal assistant settings 215 may include user-editable features for customizing the functionality of a personal assistant application running on a user device. In some embodiments, automatic personal assistant settings 215 may be used to customize the functionality of personal assistant applications on respective user devices 105 and 110 of FIG. 1. As illustrated in FIG. 2, automatic personal assistant settings 215 may include a mechanism for selection and de-selection of automatic personal assistance settings. In the shown embodiment, on/off selection buttons are illustrative examples of mechanisms for selection and de-selection of automatic personal assistance settings. In some embodiments, selection and de-selection in settings menu 205 are binary selections.

In some embodiments, automatic personal assistant settings 215 includes a sub-menu of automatic personal assistance settings 220-245, which are user-selectable options or commands for determining the functionality of auto suggest software running on the user device. The automatic personal assistant settings 215 may include any suitable number of selectable automatic personal assistance settings 220-245, which may correspond to exemplary data to be included or excluded from a status report, as shown in FIG. 2. In the illustrated embodiment, automatic personal assistant settings 215 is selected to be "ON," indicating the feature is activated.

In the illustrated embodiment, exemplary automatic personal assistant settings 235-245 are shown, including auto answer settings 220, auto search settings 240, and auto load settings 245. Automatic personal assistant settings 220-245 may be used to allow or disallow interaction between a first personal assistant on a first user device and a second personal assistant on a second user device. In some embodiments, automatic personal assistant settings 220-245 may be used to configure automatic personal assistant features based on user preferences.

Auto answer settings 220 include any suitable number of selectable sub-settings for delivering an answer with a first personal assistant to a second personal assistant. Auto answer settings 220 may allow a user to configure a first personal assistant on a first user device to automatically respond to incoming messages or commands from a second user device and/or a second personal assistant on the second user device. As shown, auto answer settings 220 include input type settings 235, which may be used to define what types of automatic replies may be used by a personal assistant.

Auto answer settings 220 may also include with approval 225 and w/o (without) approval 230 options, which may allow a user to permit automatic answers to different types of incoming communications with or without user approval of individual answers. In some embodiments, a user may select with approval 225 option to permit a personal assistant to automatically receive and process an input command from a third party device as well as identify a responsive action and/or answer but the personal assistant must prompt the user for permission for approval before performing the responsive action and/or sending an answer. In some embodiments, a user may select w/o approval 230 option to permit the personal assistant to automatically perform the identified action and/or send an answer without prompting the user for approval. Exemplary input type settings 235 are shown, including email, text, voicemail, and personal assistant. In some embodiments, an input type setting 235 is turned on, which allows a personal assistant to automatically answer incoming communications (i.e., input) of that type. For example, in the illustrated embodiment, email, text, and voicemail inputs are turned ON at with approval 225 and OFF at w/o approval 230, which may permit a personal assistant to answer email, text, and voicemail input only with user approval. User approval may be obtained, for example, via a prompt displayed to the user when an input of any of these types is received or when provided by the user un-prompted. Also as shown, personal assistant input is turned OFF at with approval 225 and ON at w/o approval 230, which may permit the personal assistant to automatically answer personal assistant input (i.e., from a second personal assistant on a second user device) without approval. It will be understood that the input types shown are merely exemplary and that any suitable input types may be automatically responded to by a personal assistant and associated settings configurable at input type settings 235.

Auto search settings 240 may allow the user to configure a personal assistant to automatically search information sources/databases on the user device, including, for example, contacts, calendar, and geolocation. In the illustrated embodiment, contacts, calendar, and geolocation are all shown as ON. For example, a personal assistant may receive input from a second personal assistant, where the input is a request for a phone number of a particular person. The personal assistant may, in response, automatically search the contacts stored locally on the user device and automatically provide the contact information to the second personal assistant. A personal assistant may automatically search an allowed local information source based on keywords parsed from received input.

Auto load settings 228 may allow a user to configure a personal assistant to automatically load information to the user device based on received input. Auto load settings 228 may allow automatic loading of, for example, a reminder entry or a calendar entry, both of which are shown as ON in FIG. 2. A personal assistant may automatically load an entry to the user device based on keywords parsed from received input. Automatically loaded entries may include any suitable data uploaded to the user device and responsive to a received input.

It will be understood that the illustrated automatic personal assistance settings are merely exemplary and not provided by way of limitation. Any suitable settings for configuring automatic answers by a personal assistant may be used. For example, settings may also be used to set which types of outputs a personal assistant may use in automatically responding to received input (e.g., email, text, phone call, or personal assistant command).

Figure 3:
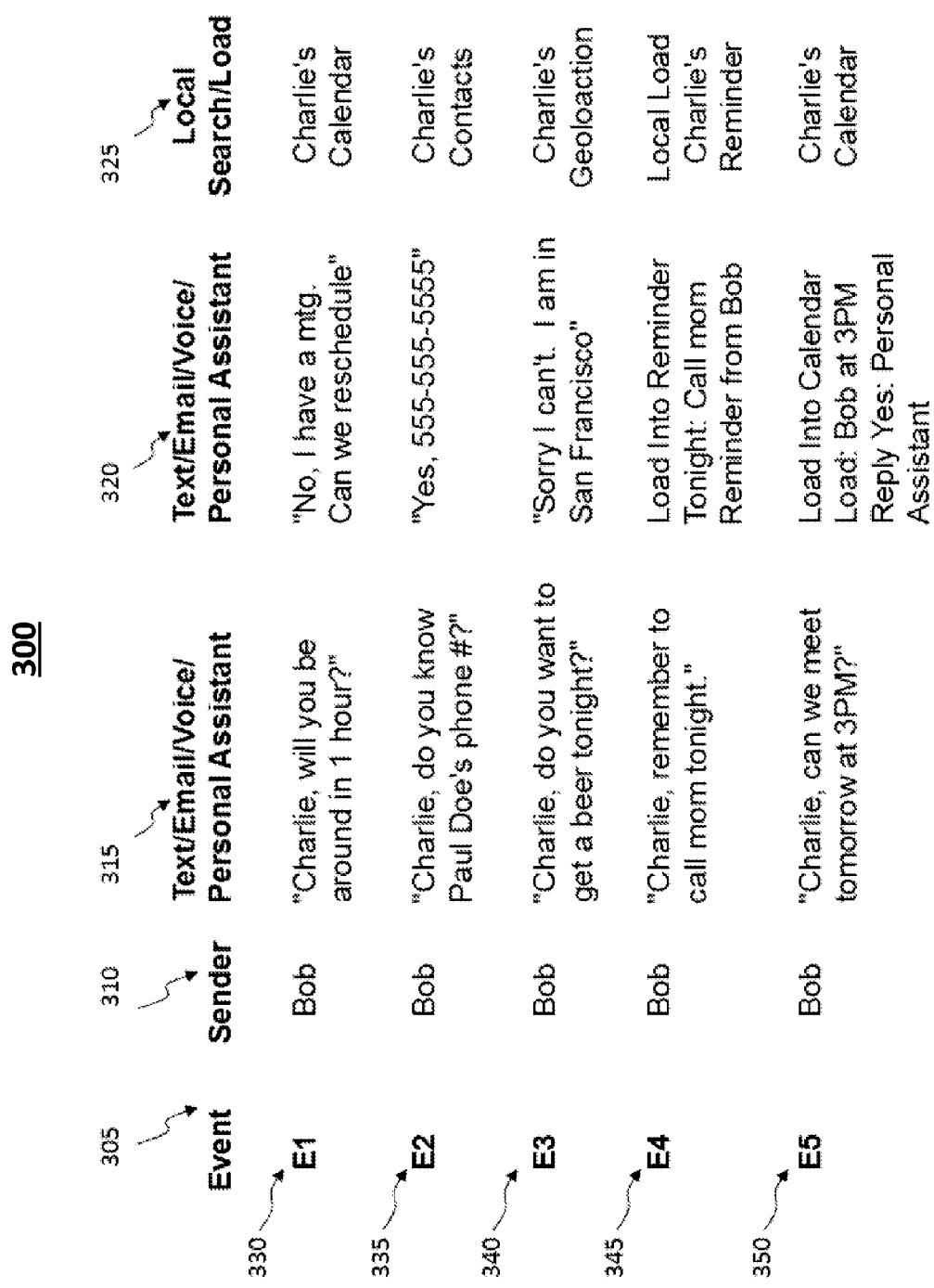
FIG. 3 is an illustrative table of automatic answers provided by a personal assistant in response to received inputs.

FIG. 3 is an illustrative table 300 of automatic answers 320 provided by a personal assistant in response to received inputs 315. Rows 330, 335, 340, 345, and 350 respectively correspond to Events 305, E1-E5, each showing a different exemplary received text/email/voice/personal assistant input 315 sent from user Bob 310, and the corresponding text/email/ voice/personal assistant output 320 and local search or local load 325, as performed by the system. In some embodiments, received inputs 315 correspond to personal assistant input received at a communications interface of a user device. For example, input generated by a personal assistant on user device 110 may be received by a personal assistant on user device 105 via a user interface, as described above in connection with FIG. 1.

Events E1 330, E2 335, and E3 340 present scenarios in which a personal assistant provides an answer to a received input based on a search, because the system identifies a keyword in the received input indicating that a search is necessary for responding to the received input. In some embodiments, the personal assistant may search any locally stored database or information source on the user device as long as the user settings do not disallow automatic searching of the database or information source. As described above in connection with FIG. 2, automatic personal assistant settings 215 may include auto search settings 240, by which a user may allow or disallow automatic searches in local information sources, including email, contacts, and geolocation data. For example, in Event E2 335, Bob may send a text message to Charlie [Charlie, do you know Paul Doe's phone #?], and Charlie's personal assistant may search Charlie's contacts 325 stored on Charlie's user device and send a responsive text message [Yes, 555-555-5555] 320. In some embodiments, an automatic answer may include a local search, a responsive communication, or both.

Figure 4:
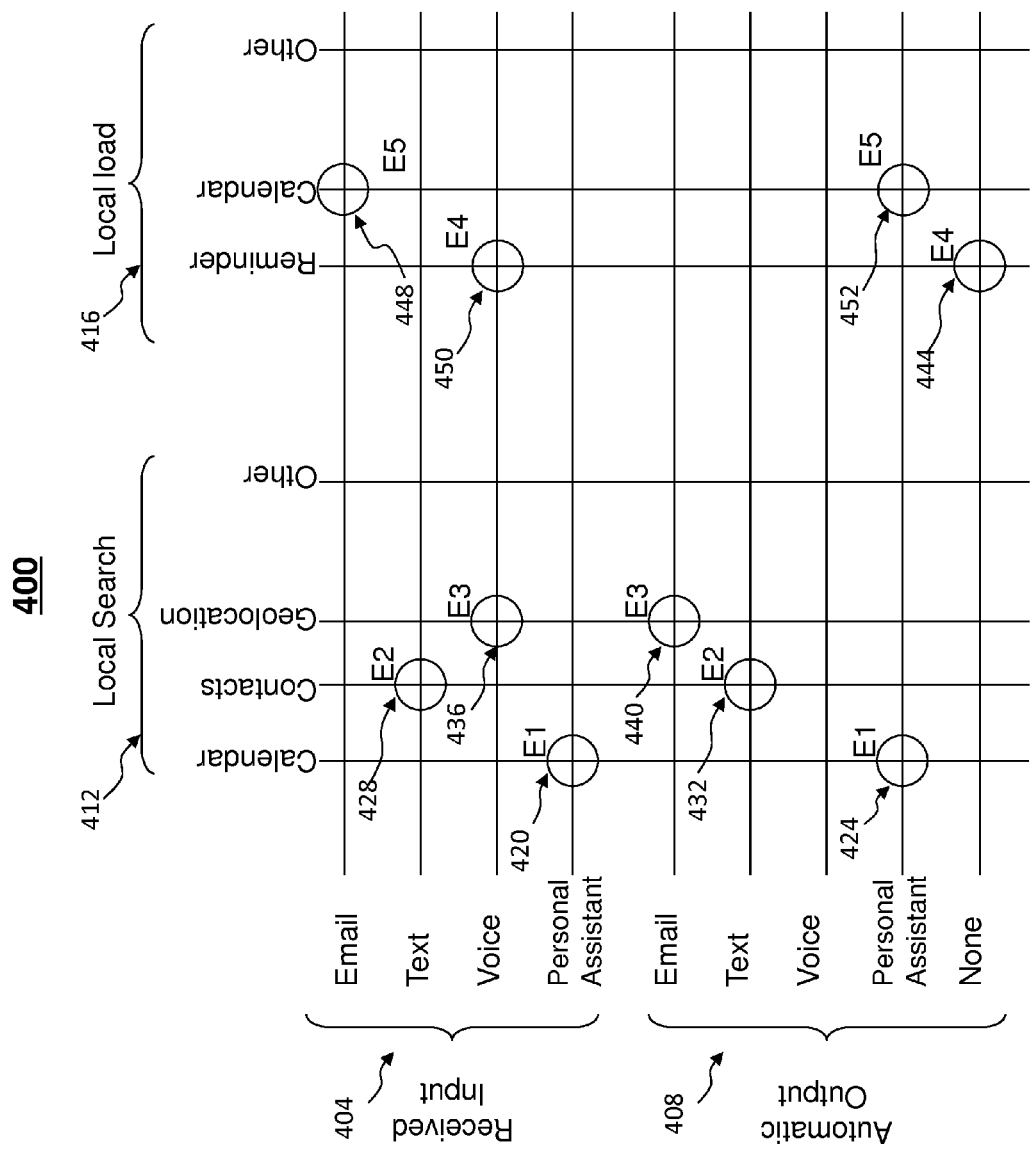
FIG. 4 is an illustrative table of received inputs, local searches, local loads, and automatic outputs.

Events E4 345 and E5 350 present scenarios in which a personal assistant provides an answer to a received input based on a data load, because the system identifies a keyword in the received input indicating that a data load is necessary for responding to the received input. As described above in connection with FIG. 2, automatic personal assistant settings 215 may include auto load settings 245, by which a user may allow or disallow automatic loads, including, for example, reminder and calendar loads. For example, in Event E4 345, Bob may leave a voicemail message for Charlie [Charlie, remember to call mom tonight], and Charlie's personal assistant may perform a local load to add a reminder to Charlie's reminder application 325 [Tonight: Call mom reminder from Bob]. In some embodiments, an automatic answer may include a local load, a responsive communication, or both. FIG. 4, described below, is an illustrative table, which further defines example Events, as described in connection with FIG. 3.

FIG. 4 is an illustrative table 400 of received inputs 404, local searches 412, local loads 416, and automatic outputs 408. Illustrative table 400 of FIG. 4 further defines exemplary Events described above in connection with FIG. 3. Events E1-E5, shown in FIG. 4, correspond to events 330-350 of FIG. 3, as described above. Table 400 provides exemplary combinations of types of received inputs 404, including email, text, voice, and personal assistant, and types of automatic outputs 408, including email, text, voice, personal assistant, and none. Local searches 412 include calendar, contacts, geolocation, and other, and local loads 416 include reminder, calendar, and other.

Event E1 presents a scenario in which personal assistant command 420 is received input 404, including an indication that a local search of a calendar is needed, and personal assistant command 424 is provided as automatic output 408. Event E2 presents a scenario in which text message 428 is received input 404, including an indication that a local search of contacts is needed, and text message 432 is provided as automatic output 408. Event E3 presents a scenario in which voicemail 436 is received input 404, including an indication that a local search of geolocation data is needed, and email 440 is provided as automatic output 408.

Event E4 presents a scenario in which voicemail 450 is received input 404, including an indication that a local load of a reminder is needed, and no response 424 is provided as automatic output 408. Event E5 presents a scenario in which email 448 is received input 404, including an indication that a local load of a calendar entry is needed, and personal assistant command 452 is provided as automatic output 408.

It will be understood that the illustrated Events E1-E5 are merely exemplary and not provided by way of limitation. It will be understood that the system may use any suitable combination of local searches 412 and/or local loads 416 with received input 404 and/or automatic output 408 to obtain a wide variety of possible events.

Figure 5:
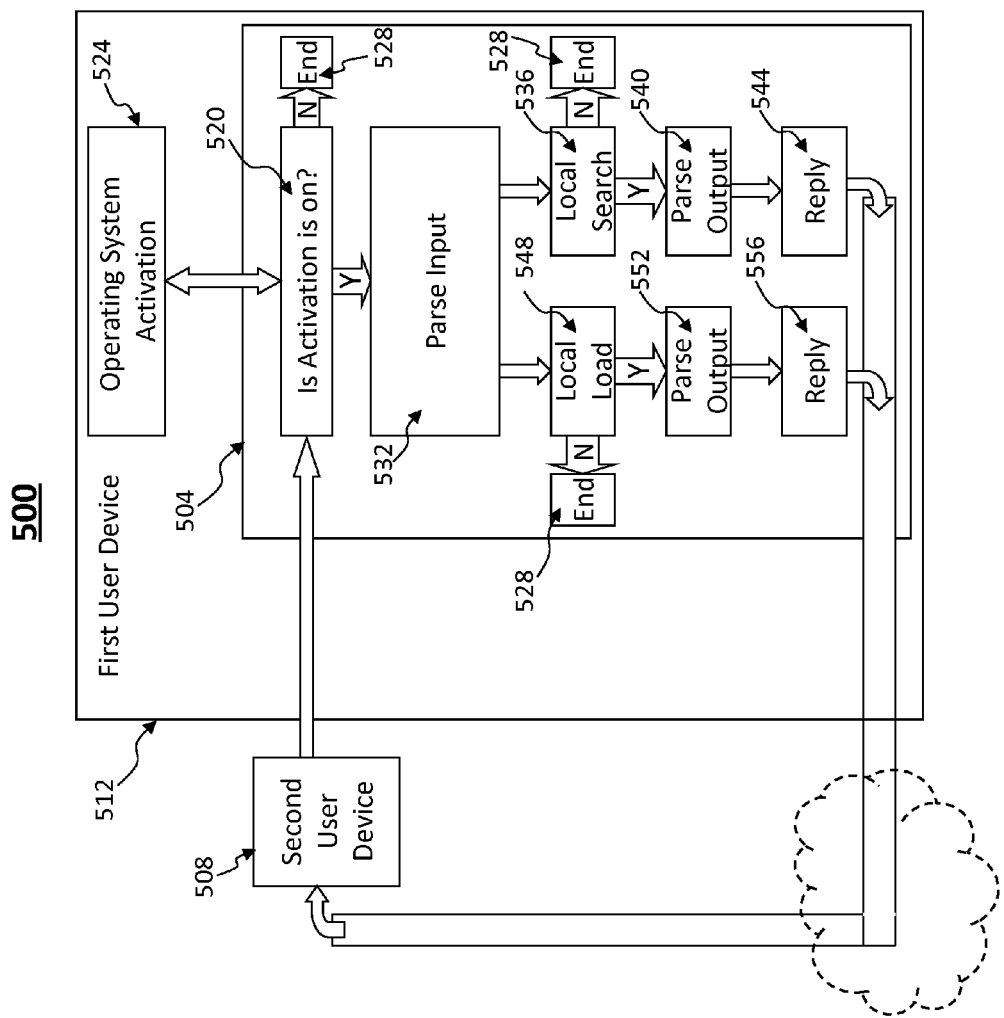
FIG. 5 is a flowchart illustrating an exemplary method for providing automatic personal assistance on a first user device in response to an input communication received from a second user device.

FIG. 5 is a flowchart illustrating an exemplary method 500 for providing automatic personal assistance on first user device 512 in response to an input communication received from second user device 508. In some embodiments, first user device 512 and second user device 508 may correspond to respective user devices 105 and 110 of FIG. 1. In some embodiments, first user device 512 includes first personal assistant 405, and second user device 508 includes a second personal assistant (not shown). In some embodiments, first user device 512 and second user device 508 are smartphones.

In step 524, the operating system of first user device 512 activates an automatic personal assistant feature of personal assistant 504. At step 520, the system determines whether the automatic personal assistant feature is activated. If the system determines the automatic personal assistant feature is activated, then it proceeds to step 532. If the system determines that the automatic personal assistant feature is deactivated, then the system proceeds to end 528.

In step 532, the system parses the input. In some embodiments, step 532 may be a first stage of the first personal assistant 504 parsing the input. In some embodiments, step 532 may be performed by an input section of a set of routines in a software module. In some embodiments, in step 532 the system may identify keywords in a received input communication and interact with a personal assistant server (e.g., personal assistant server 180) over a network (e.g., network 175) in order to determine a responsive action to the received input. If the system determines that a local load is necessary based on parsing the received input, the system will proceed to step 548. If the system determines that a local search is necessary based on parsing the received input, the system will proceed to step 536.

In step 548, the system determines if a local load should be performed. If the system determines that the user has deactivated the local load feature in settings, the system will proceed to end 528. If the system determines that the user has activated the local load feature in settings, the system may then determine if any entries need to be made to local applications based on keywords identified in step 532. For example, the system may identify a calendar entry that needs to be loaded into the calendar application. If the system determines that a local load needs to be performed, the system will perform the local load in step 548. For example, the system will create a calendar entry and load it into the calendar application.

In step 536, the system determines if a local search should be performed. If the system determines that the user has deactivated the local search feature in settings, the system will proceed to end 528. If the system determines that the user has activated the local search feature in settings, the system may then determine if any searches need to be performed based on keywords identified in step 532. For example, the system may determine that a search of a calendar is needed to determine the first user's availability. If the system determines that a local search needs to be performed, the system will perform the local search in step 536.

In step 552, the system parses output by interacting with other local applications (e.g., applications 140 of user device 105 of FIG. 1) in order to determine a responsive action based on a local load on first user device 512. In some embodiments, step 552 may be implemented as an output section of a set of routines in a software module. For example, the system may extract meeting time data from a received input communication and communicate with a calendar application so that a meeting entry may be loaded into the local calendar application. The system may also insert an indication that the calendar entry was loaded to the calendar application into a responsive communication. In step 556, a responsive output communication (i.e., Reply) is generated and sent over a network (e.g., network 175 of FIG. 1) to second user device 508. In some embodiments, the responsive output may be a natural language response. In some embodiments, the responsive output may be include information associated with a local load. For example, the responsive output may include confirmation that a local load was performed.

In step 540, the system parses output by interacting with a personal assistant server (e.g., personal assistant server 180 of FIG. 1) in order to determine a responsive action based on information gathered in a local search of first user device 512. In some embodiments, step 540 may be implemented as an output section of a set of routines in a software module. For example, the system may extract a person's phone number from an entry in contacts stored in memory on first user device 512 based on the person's name being mentioned and identified as a keyword in the received input communication. The system may also insert that number into a reply text message. In step 544, a responsive output communication (i.e., Reply) is generated and sent over a network (e.g., network 175 of FIG. 1) to second user device 508. In some embodiments, the responsive output may be a natural language response. In some embodiments, the responsive output may be include information associated with a local search performed in step 536. For example, the responsive output may include information extracted as a result of the local search.

Steps 556 and 544 may be implemented using any suitable communication medium, including email, voice, text message, or personal assistant command. In some embodiments, responsive output may be sent over a network, for example, network 175 of FIG. 1. In some embodiments, the system does not perform steps 556 or 544, and no responsive output is generated or sent to second user device 508.

Figure 6:
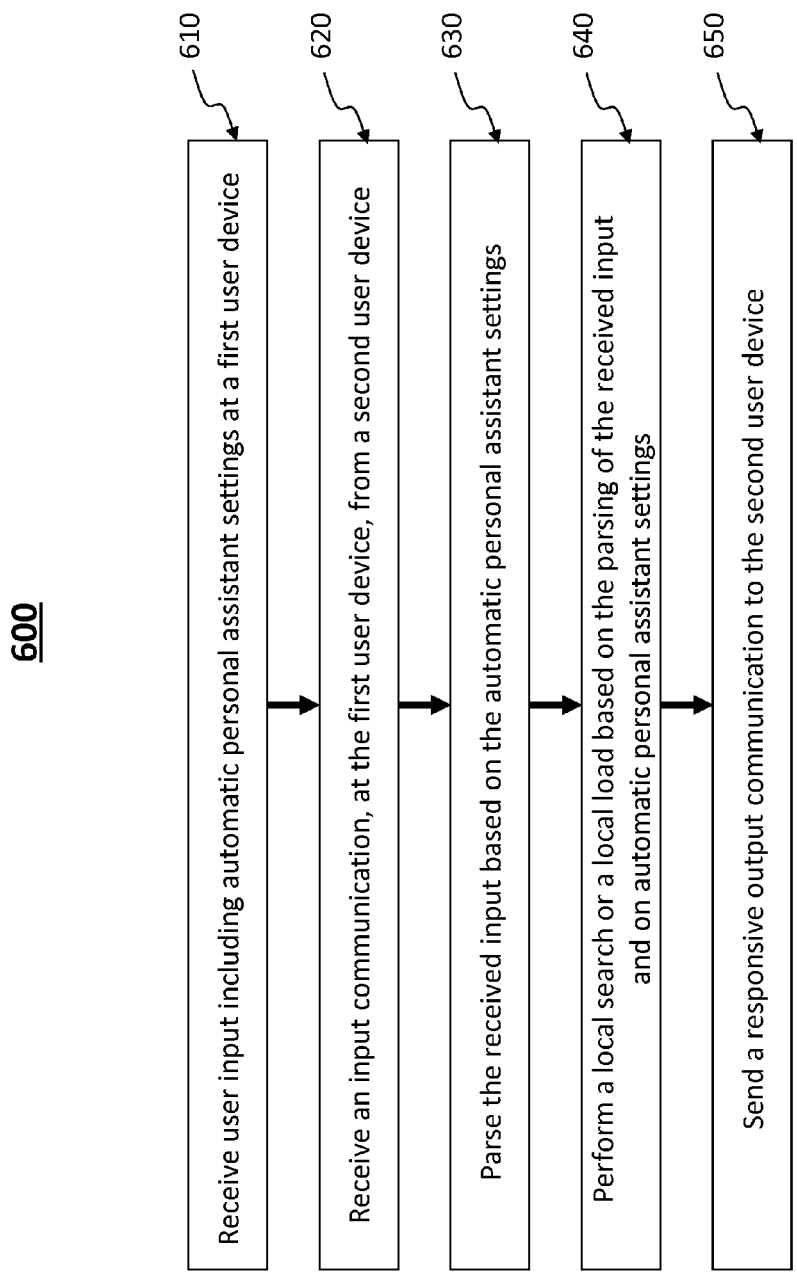
FIG. 6 is a flowchart illustrating an exemplary method for providing automatic personal assistance on a user device.

FIG. 6 is a flowchart illustrating an exemplary method for providing automatic personal assistance on a user device.

In step 610, the system receives user input, the user input including automatic personal assistant settings, at a user interface of a first user device. In some embodiments, the automatic personal assistant settings may correspond to automatic personal assistant settings 215 as described above in connection with FIG. 2.

In step 620, the system receives an input communication, at a communication interface of the first user device, where the input communication is sent from a second user device. In some embodiments, the input communication may be generated by a second personal assistant on the second user device. In some embodiments, the received input may be communicated over a network, for example, network 175 of FIG. 1.

In step 630, the system parses the received input, with a first personal assistant on the first user device, based on the automatic personal assistant settings. In some embodiments, the first personal assistant may parse the received input only if an automatic personal assistant feature is turned ON in user settings of the first user device. In some embodiments, the first personal assistant processes the received input to identify a responsive action to the received input.

In step 640, the system performs a local search or a local load based on the parsing of the received input and on automatic personal assistant settings. In some embodiments, the first personal assistant may perform a responsive action, including a local search or a local load based on the responsive action identified in step 630. In some embodiments, the scope of the local search (i.e., local data sources that can be searched) is based on user settings received in step 610. In some embodiments, the scope of the local load (i.e., what types of local loads may be loaded) is based on user settings received in step 610. In some embodiments, the first personal assistant may perform both a local search and a local load when it determines, based on the parsing of the received input in 630, that both are necessary.

In step 650, the system sends a responsive output communication to the second user device. As described above in connection with FIG. 4, a responsive output may include any suitable type of communication, including, for example, email, voice (e.g., phone call or voicemail), text message, and personal assistant command. In some embodiments, the first personal assistant does not send a responsive output communication to the second user device. In some embodiments, the responsive output may be communicated over a network, for example, network 175 of FIG. 1.

Figure 7:
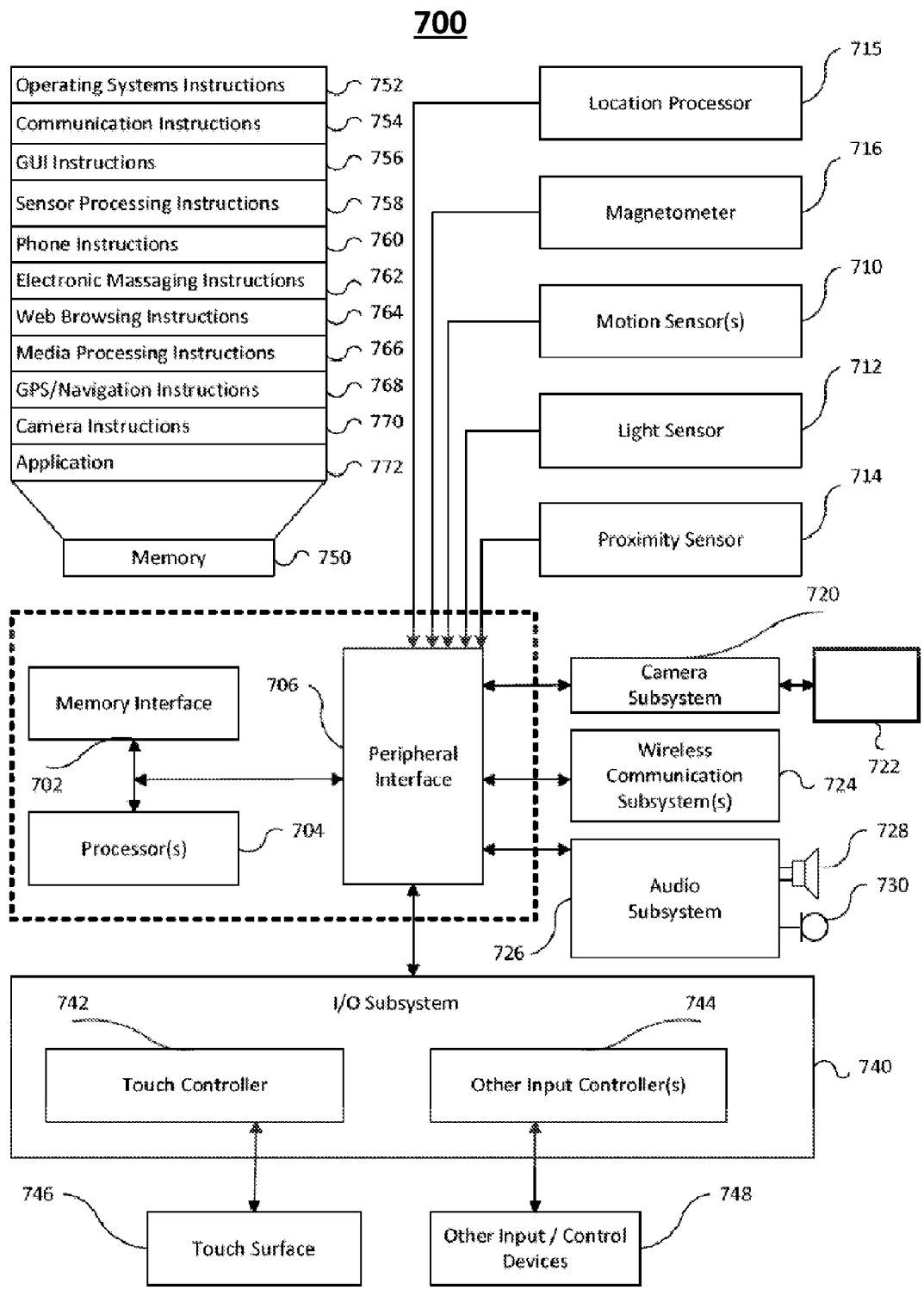
FIG. 7 illustrates an exemplary device architecture of a user device that may be used with a system for providing automatic personal assistant features on a user device.

FIG. 7 illustrates a mobile device architecture that may be utilized to implement the various features and processes described herein. Architecture 700 can be implemented in any number of portable devices including but not limited to smart phones, electronic tablets, and gaming devices. Architecture 700 as illustrated in FIG. 7 includes memory interface 702, processors 704, and peripheral interface 706. Memory interface 702, processors 704 and peripherals interface 706 can be separate components or can be integrated as a part of one or more integrated circuits. The various components can be coupled by one or more communication buses or signal lines.

Processors 704 as illustrated in FIG. 7 is meant to be inclusive of data processors, image processors, central processing unit, or any variety of multi-core processing devices. Any variety of sensors, external devices, and external subsystems can be coupled to peripherals interface 706 to facilitate any number of functionalities within the architecture 700 of the exemplar mobile device. For example, motion sensor 710, light sensor 712, and proximity sensor 714 can be coupled to peripherals interface 706 to facilitate orientation, lighting, and proximity functions of the mobile device. For example, light sensor 712 could be utilized to facilitate adjusting the brightness of touch surface 746. Motion sensor 710, which could be exemplified in the context of an accelerometer or gyroscope, could be utilized to detect movement and orientation of the mobile device. Display objects or media could then be presented according to a detected orientation (e.g., portrait or landscape).

Other sensors could be coupled to peripherals interface 706, such as a temperature sensor, a biometric sensor, or other sensing device to facilitate corresponding functionalities. Location processor 715 (e.g., a global positioning transceiver) can be coupled to peripherals interface 706 to allow for generation of geolocation data thereby facilitating geopositioning. An electronic magnetometer 716 such as an integrated circuit chip could in turn be connected to peripherals interface 706 to provide data related to the direction of true magnetic North whereby the mobile device could enjoy compass or directional functionality. Camera subsystem 720 and an optical sensor 722 such as a charged coupled device (CCD) or a complementary metal-oxide semiconductor (CMOS) optical sensor can facilitate camera functions such as recording photographs and video clips.

Communication functionality can be facilitated through one or more communication subsystems 724, which may include one or more wireless communication subsystems. Wireless communication subsystems 724 can include 802.x or Bluetooth transceivers as well as optical transceivers such as infrared. Wired communication system can include a port device such as a Universal Serial Bus (USB) port or some other wired port connection that can be used to establish a wired coupling to other computing devices such as network access devices, personal computers, printers, displays, or other processing devices capable of receiving or transmitting data. The specific design and implementation of communication subsystem 724 may depend on the communication network or medium over which the device is intended to operate. For example, a device may include wireless communication subsystem designed to operate over a global system for mobile communications (GSM) network, a GPRS network, an enhanced data GSM environment (EDGE) network, 802.x communication networks, code division multiple access (CDMA) networks, or Bluetooth networks. Communication subsystem 724 may include hosting protocols such that the device may be configured as a base station for other wireless devices. Communication subsystems can also allow the device to synchronize with a host device using one or more protocols such as TCP/IP, HTTP, or UDP.

Audio subsystem 726 can be coupled to a speaker 728 and one or more microphones 730 to facilitate voice-enabled functions. These functions might include voice recognition, voice replication, or digital recording. Audio subsystem 726 in conjunction may also encompass traditional telephony functions.

I/O subsystem 740 may include touch controller 742 and/or other input controller(s) 744. Touch controller 742 can be coupled to a touch surface 746. Touch surface 746 and touch controller 742 may detect contact and movement or break thereof using any of a number of touch sensitivity technologies, including but not limited to capacitive, resistive, infrared, or surface acoustic wave technologies. Other proximity sensor arrays or elements for determining one or more points of contact with touch surface 746 may likewise be utilized. In one implementation, touch surface 746 can display virtual or soft buttons and a virtual keyboard, which can be used as an input/output device by the user.

Other input controllers 744 can be coupled to other input/control devices 748 such as one or more buttons, rocker switches, thumb-wheels, infrared ports, USB ports, and/or a pointer device such as a stylus. The one or more buttons (not shown) can include an up/down button for volume control of speaker 728 and/or microphone 730. In some implementations, device 700 can include the functionality of an audio and/or video playback or recording device and may include a pin connector for tethering to other devices.

Memory interface 702 can be coupled to memory 750. Memory 750 can include high-speed random access memory or non-volatile memory such as magnetic disk storage devices, optical storage devices, or flash memory. Memory 750 can store operating system 752, such as Darwin, RTXC, LINUX, UNIX, OS X, ANDROID, WINDOWS, or an embedded operating system such as VxWorks. Operating system 752 may include instructions for handling basic system services and for performing hardware dependent tasks. In some implementations, operating system 752 can include a kernel.

Memory 750 may also store communication instructions 754 to facilitate communicating with other mobile computing devices or servers. Communication instructions 754 can also be used to select an operational mode or communication medium for use by the device based on a geographic location, which could be obtained by the GPS/Navigation instructions 768. Memory 750 may include graphical user interface instructions 756 to facilitate graphic user interface processing such as the generation of an interface; sensor processing instructions 758 to facilitate sensor-related processing and functions; phone instructions 760 to facilitate phone-related processes and functions; electronic messaging instructions 762 to facilitate electronic-messaging related processes and functions; web browsing instructions 764 to facilitate web browsing-related processes and functions; media processing instructions 766 to facilitate media processing-related processes and functions; GPS/Navigation instructions 768 to facilitate GPS and navigation-related processes, camera instructions 770 to facilitate camera-related processes and functions; and instructions 772 for any other application that may be operating on or in conjunction with the mobile computing device. Memory 750 may also store other software instructions for facilitating other processes, features and applications, such as applications related to navigation, social networking, location-based services or map displays.

Each of the above identified instructions and applications can correspond to a set of instructions for performing one or more functions described above. These instructions need not be implemented as separate software programs, procedures, or modules. Memory 750 can include additional or fewer instructions. Furthermore, various functions of the mobile device may be implemented in hardware and/or in software, including in one or more signal processing and/or application specific integrated circuits.

Certain features may be implemented in a computer system that includes a back-end component, such as a data server, that includes a middleware component, such as an application server or an Internet server, or that includes a front-end component, such as a client computer having a graphical user interface or an Internet browser, or any combination of the foregoing. The components of the system can be connected by any form or medium of digital data communication such as a communication network. Some examples of communication networks include LAN, WAN and the computers and networks forming the Internet. The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments may be implemented using an API that can define on or more parameters that are passed between a calling application and other software code such as an operating system, library routine, function that provides a service, that provides data, or that performs an operation or a computation. The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API. In some implementations, an API call can report to an application the capabilities of a device running the application, such as input capability, output capability, processing capability, power capability, and communications capability.

The foregoing detailed description of the technology herein has been presented for purposes of illustration and description. It is not intended to be exhaustive or to limit the technology to the precise form disclosed. Many modifications and variations are possible in light of the above teachings. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for providing automatic personal assistance on a first user device, the method comprising:
receiving a voice-based input communication at the first user device, the input communication sent over a communication network from a second device;

executing instructions stored in memory, wherein the execution of instructions by a processor executes the first personal assistant on the first user device to:
- activates an automatic mode of the first personal assistant,
- automatically parses the received voice-based input communication to identify one or more keywords in the received voice-based input communication,
- determines that the one or more parsed keywords are associated with a responsive action,
- performs the identified responsive action, and
- generates a voice-based output communication responsive to the voice-based input communication, wherein the voice-based output communication includes information associated with the performed responsive action; and transmits the voice-based output communication over the communication network to the second device.

2. The method of claim 1, further comprising receiving the voice-based user input at a user interface of the first user device, wherein the user input is associated with automatic personal assistant settings, and wherein the automatic mode of the first personal assistant is activated based on the automatic personal assistant settings.

3. The method of claim 2, wherein the automatic personal assistant settings specify types of received input communications for which the automatic mode of the first personal assistant can be activated.

4. The method of claim 1, wherein the responsive action comprises searching data stored locally in memory of the first user device.

5. The method of claim 4, wherein the information associated with the performed responsive action includes search results.

6. The method of claim 4, wherein the searched data comprises contacts data.

7. The method of claim 4, wherein the searched data comprises calendar data.

8. The method of claim 4, wherein the searched data comprises geolocation data.

9. The method of claim 4, further comprising receiving the voice-based user input at a user interface of the first device, wherein the voice-based user input is associated with automatic search settings, and wherein the automatic search settings specify which of a plurality of local data sources are accessible for search by the first personal assistant.

10. The method of claim 1, wherein the responsive action comprises creating an entry in an application on the first user device by loading data from the received input into the entry.

11. The method of claim 10, wherein the information associated with the performed responsive action includes confirmation that the entry has been created.

12. The method of claim 10, wherein the created entry comprises a calendar application entry.

13. The method of claim 10, wherein, the created entry comprises a reminder application entry.

14. The method of claim 10, further comprising receiving the voice-based user input at a user interface of the first device, wherein the voice-based user input includes is associated with automatic load settings, and wherein the automatic load settings specify for which of a plurality of applications the first personal assistant is allowed to create entries.

15. The method of claim 1, wherein the first user device and the second user device are mobile devices.

16. A system for providing automatic personal assistance on a first user device, the system comprising:
- a communication interface that receives a voice-based input communication at the first user device, the voice-based input communication sent over a communication network from a second device;
- a processor that executes the first personal assistant on the first user device, wherein the execution of first personal assistant by the processor:
  - activates an automatic mode of the first personal assistant,
  - automatically parses the received voice-based input communication to identify one or more keywords in the received voice-based input communication,
  - determines that the one or more parsed keywords are associated with a responsive action,
  - performs the identified responsive action, and
  - generates a voice-based output communication responsive to the voice-based input communication, wherein the voice-based output communication includes information associated with the performed responsive action; and
- wherein the communication interface transmits the voice-based output communication over the communication network to the second device.

17. The system of claim 16, further comprising memory that stores data locally, wherein the responsive action comprises searching the locally stored data.

18. The system of claim 16, wherein the responsive action comprises creating an entry in an application on the first user device by loading data from the received input into the entry.

19. The system of claim 16, further comprising a user interface that receives user input regarding settings, and wherein the settings specify how the responsive action is identified or performed.

20. A non-transitory computer-readable storage medium, having embodied thereon a program executable by a processor to provide automatic personal assistance on a first user device, the method comprising:
- receiving a voice-based input communication, at a communications interface on the first user device, the input communication transmitted over a network from a second device;
- activating an automatic mode of a first personal assistant on the first user device;
- parsing the received voice-based input communication, by the first personal assistant, to identify one or more keywords in the received input communication, the one or more keywords associated with a responsive action, wherein the first personal assistant processes the received voice-based input communication automatically;
- performing the identified responsive action, by the first personal assistant; and
- generating a voice-based output communication responsive to the voice-based input communication, by the first personal assistant, wherein the output communication is transmitted over the network to the second device, and wherein the voice-based output communication includes information associated with the performed responsive action.

* * * * *